United States Patent
Dadwal et al.

(10) Patent No.: US 12,301,697 B2
(45) Date of Patent: May 13, 2025

(54) HETEROGENEOUS CLOCK MANAGEMENT SOLUTION

(71) Applicant: Intel Corporation, Santa Clara, CA (US)

(72) Inventors: Vikram Dadwal, Chandler, AZ (US); James Coleman, Mesa, AZ (US); Alexander Slota, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 17/132,058

(22) Filed: Dec. 23, 2020

(65) Prior Publication Data

US 2021/0111862 A1    Apr. 15, 2021

(51) Int. Cl.
*G06F 1/12* (2006.01)
*G06F 1/14* (2006.01)
*H04L 7/04* (2006.01)

(52) U.S. Cl.
CPC .................. *H04L 7/04* (2013.01); *G06F 1/12* (2013.01); *G06F 1/14* (2013.01)

(58) Field of Classification Search
CPC ..... G06F 1/32; G06F 9/44; G06F 1/12; G06F 1/26
See application file for complete search history.

(56) References Cited

U.S. PATENT DOCUMENTS

| | | | | |
|---|---|---|---|---|
| 6,631,483 | B1 * | 10/2003 | Parrish ...................... | G06F 1/12 713/400 |
| 6,763,079 | B1 * | 7/2004 | Iwamoto ............... | H03L 7/0814 375/376 |
| 2009/0316847 | A1 * | 12/2009 | Thomsen .............. | H03L 7/0991 375/373 |
| 2013/0185675 | A1 * | 7/2013 | Perry .................. | H04L 27/0002 715/832 |
| 2015/0033060 | A1 | 1/2015 | Kim et al. | |
| 2020/0133330 | A1 | 4/2020 | Bordogna et al. | |
| 2021/0159903 | A1 * | 5/2021 | Murata ..................... | H03L 7/22 |

OTHER PUBLICATIONS

"European Application Serial No. 21197640.2, Response filed Dec. 29, 2022 to Extended European Search Report mailed Mar. 17, 2022", 9 pgs.

(Continued)

*Primary Examiner* — Keshab R Pandey
(74) *Attorney, Agent, or Firm* — Schwegman Lundberg & Woessner, P.A.

(57) ABSTRACT

Systems and techniques for an heterogeneous clock management solution for industrial systems are described herein. In an example, a system includes a clock management circuit adapted to receive core timing information from a core of an integrated circuit. The clock management circuit is further adapted to correlate the core timing information with a reference clock. The clock management circuit is further adapted to output frequency and time offset of the reference clock to the core timing information. The system includes an execution circuit adapted to schedule a transaction from the core at a scheduled time relative to the reference clock using the frequency and time offset. The execution circuit is further adapted to issue a command to execute the transaction at the scheduled time.

20 Claims, 8 Drawing Sheets

(56) References Cited

OTHER PUBLICATIONS

"23.5. Synchronizing the Clocks", [Online]. Retrieved from the Internet: URL: https: access.redhat.com documentation en-us red_hat_enterprise_linux 6 html deployment_guide s1-synchronizing_the_clocks, (Accessed on Sep. 20, 2020), 29 pgs.
"European Application Serial No. 21197640.2, Extended European Search Report mailed Mar. 17, 2022", 14 pgs.
"European Application Serial No. 21197640.2, Communication Pursuant to Article 94(3) EPC mailed Oct. 15, 2024", 6 pgs.
"European Application Serial No. 21197640.2, Response filed Oct. 28, 2024 to Communication Pursuant to Article 94(3) EPC mailed Oct. 15, 2024", 7 pgs.

* cited by examiner

HETEROGENEOUS CLOCK MANAGEMENT SOLUTION

TECHNICAL FIELD

Embodiments described herein generally relate to synchronizing multiple clocks of a computer system.

BACKGROUND

Time synchronization may be issue for the architecture of automation systems, such a programmable logic controller (PLC) and a programmable automation controller (PAC) and other computer system components such as a central processing unit (CPU), a field programmable gate array (FPGA), an application specific integrated circuit (ASIC), sensors, a local area network (LAN) controller, and hardware accelerators. These comprehensive automation architectures may require the use of additional components such as an FPGA to manage different clocks and coordinate the clocks of the system, as clock may drift over time and require to be synched periodically. Some implementations may provide a millisecond range precision but as control requirements for the next generation of multi-functional controllers becomes tighter, finer level of controls may be required.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

With the increase in demand for smaller but still computationally powerful computing components, such as for mobile computing and edge computing, integrated circuits have been built which integrate many components of a computer, known as a system on a chip (SOC). Timing is critical for these SOCs such that processing performed by the SOC and the external components that the SOC interacts with are properly synchronized. Presently, custom ASICs may be built with proprietary software to achieve required synchronization times, generate various clock sources, and schedule instructions from cores at deterministic times according the ASICs time.

The systems and techniques described herein replace the need for using custom ASICs by using various hardware features, such as invariant time stamp counter (TSC), timed general purpose input/output (GPIO), and an always running timer (ART). An ART may be an internal clock built into the SOC. Utilizing these hardware features, the systems and techniques described herein may provide a clock management software architecture that may maintain clock relations and provide accurately schedule transactions at the core of the SOC relative to any clock source. The systems and techniques include a time synchronization solution for system-level technical synchronization challenges and provides a high precision level of clock synchronization (sub-microsecond range) for industrial architectures. This may reduce the overhead for designing and maintaining systems and reliance on non-integrated or third party ASICs for timing synchronization.

Various network synchronization technologies exist in the integrated circuit industry, such as FlexRay, Time Triggered Controller-Area-Network (TT-Can), Profinet, and the Institute of Electrical and Electronics Engineers (IEEE) Time Sensitive Networking (TSN) standards. The systems and techniques described herein may be agnostic to these various protocols and utilizes the network time synchronization provided by the various protocols to manage the relation between network time and system time and other devices throughout the platform.

Figure 1:
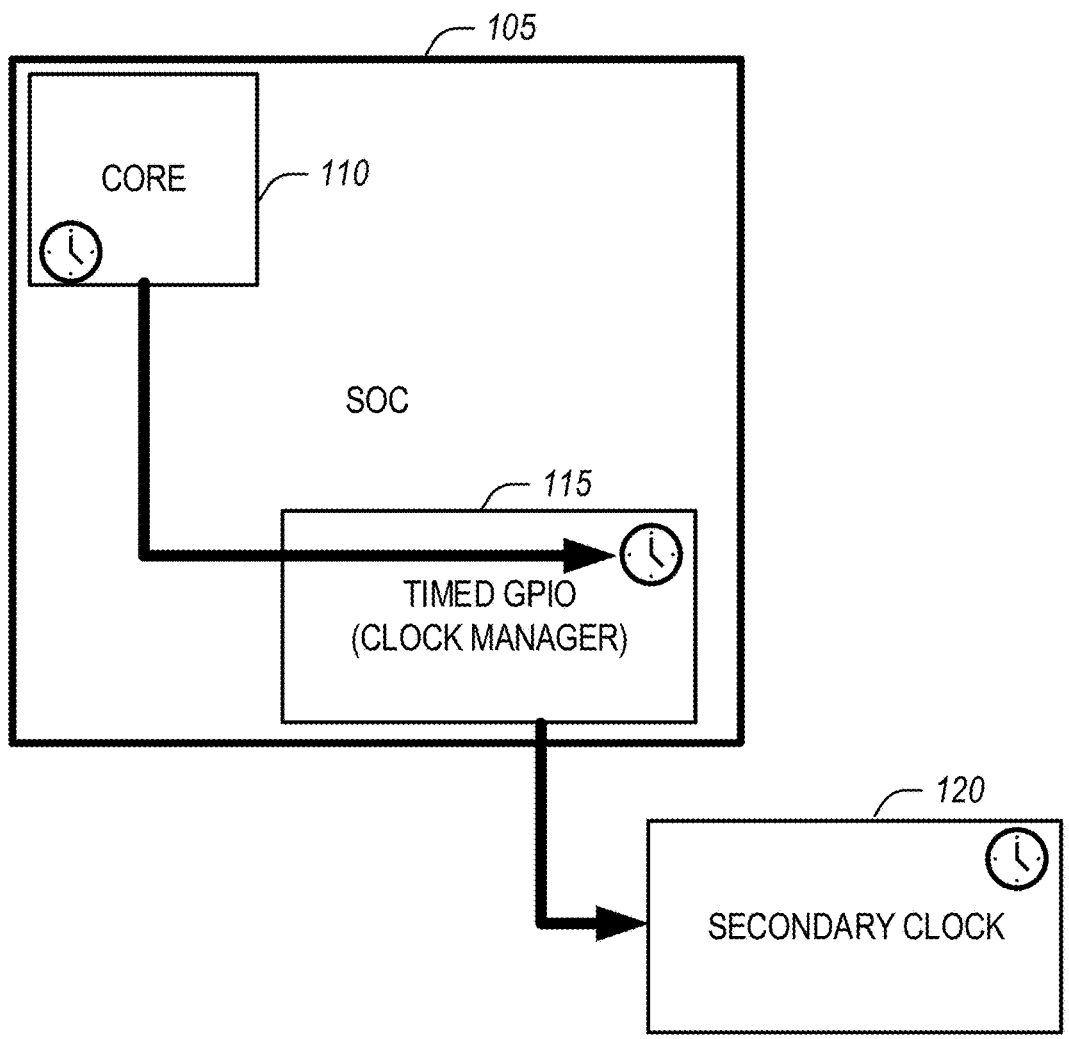
FIG. 1 illustrates an example of an integrated circuit, or system on a chip, configured with an internal clock manager, in accordance with some embodiments.

FIG. 1 illustrates an example 100 of an SOC 105 configured with an internal clock manager, in accordance with some embodiments. The core 110 of the SOC 105 may use an invariant TSC for timing information. A SOC 105 may include multiple cores, such as core 110. The multiple cores may not have their respective TSCs synchronized together. Thus, each core may need to perform the synchronization techniques described herein to perform each core's respective tasks.

The heterogeneous clock management system provides a software architecture to manage hardware synchronized times throughout the SOC and other devices connected to the platform, which may result in reduce the overhead of the clock management performed by ASICs.

The core 110 may correlate with the timed GPIO 115. The timed GPIO 115 may function as the clock manager between the core 110 and other components external to the SOC 105, where the external component has secondary clock 120. The timed GPIO 115 functioning as a clock manager may synchronize the clock of the core 110 with the secondary clock 120. Previously, an ASIC that was external to the SOC 105 may be used to perform clock management. An ASIC clock manager that is external to the SOC 105 may have delays in communicating between the core 110 and the ASIC clock manager, thus resulting in less than precise synchronization and possibly inaccuracies. Utilizing a clock internal to the SOC 105, such as an ART or the timed GPIO 115, as the clock manger may avoid communication delays and provide for more precise synchronization.

Figure 2:
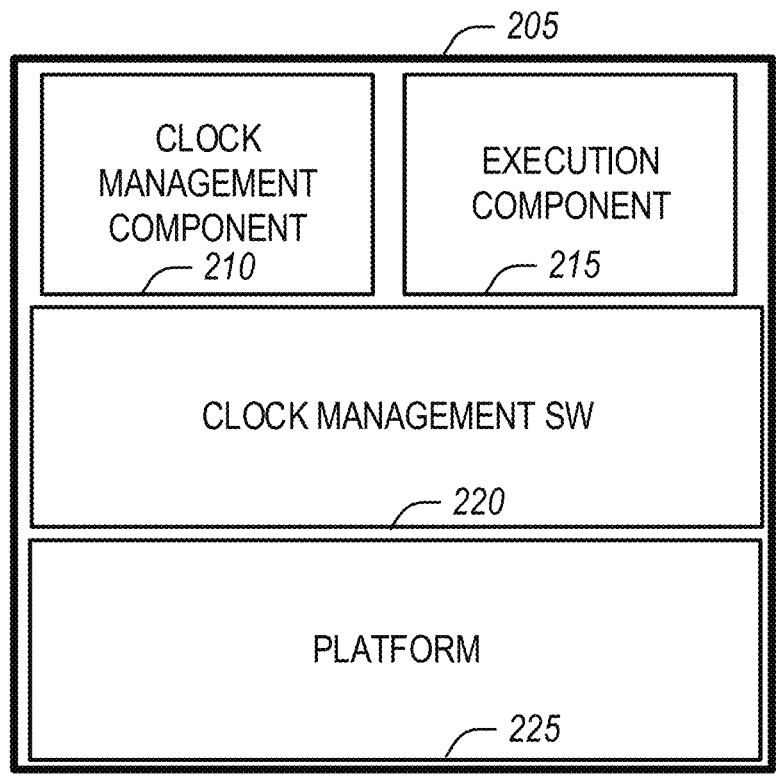
FIG. 2 illustrates the heterogeneous clock management system software stack, in accordance with some embodiments.

FIG. 2 illustrates the heterogeneous clock management system software stack 205, in accordance with some embodiments. The software stack 205 includes the platform 225 architecture which employs the clock management software 220. The clock management software 220 includes the clock management component 210 and the execution component 215. The clock management component 210 includes routines for correlating the clocks and the execution component 215 includes routines for scheduling based on the correlation. Using the heterogeneous clock management along with integrated clock, such as the timed GPIO, provides for maintaining clock relations among different clocks in the system and provides for accurately scheduling transactions at the core in relation with a reference clock.

Figure 3:
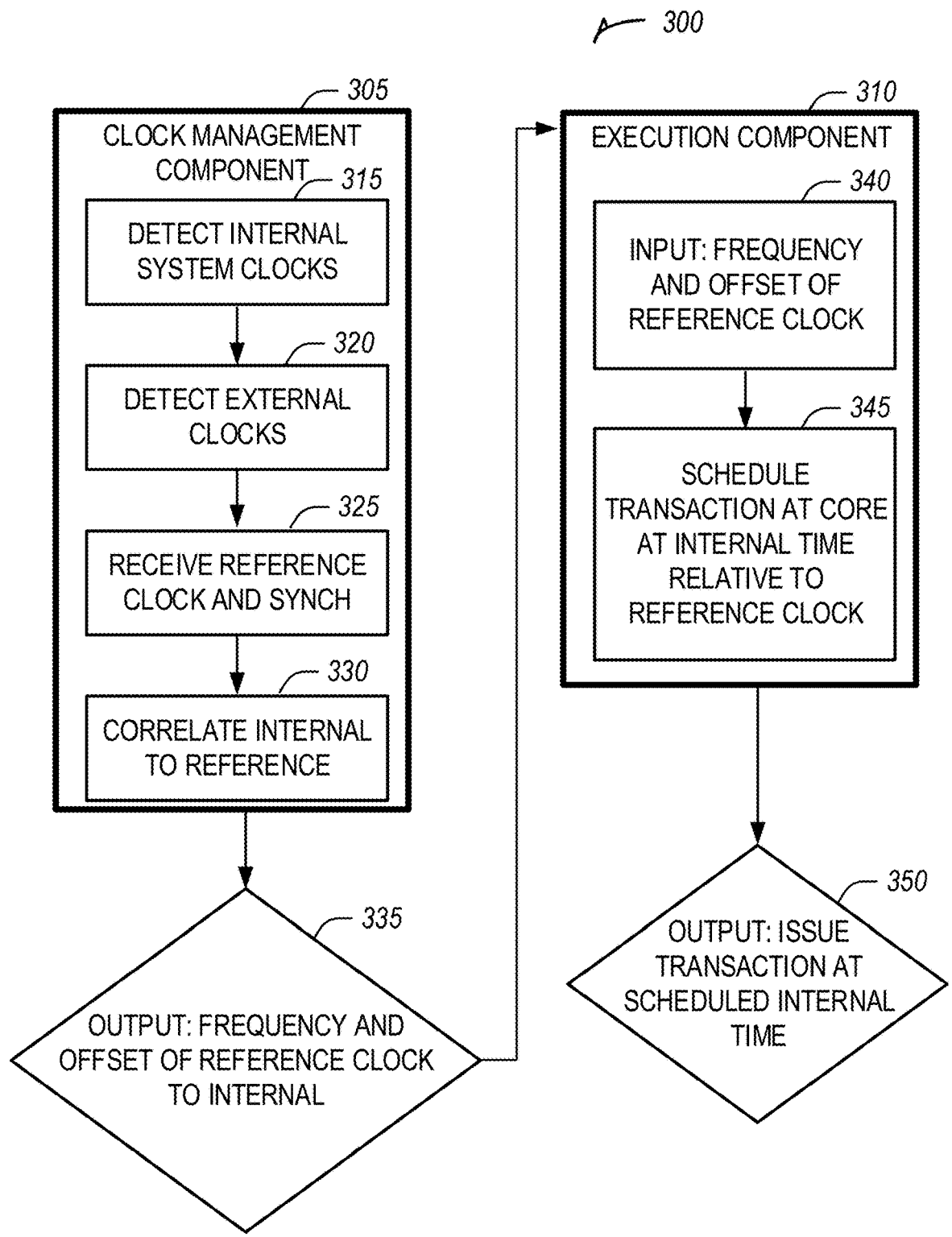
FIG. 3 illustrates a flowchart for heterogeneous clock management, in accordance with some embodiments.

FIG. 3 illustrates a flowchart 300 for heterogeneous clock management, in accordance with some embodiments. The heterogeneous clock management may be performed with an integrated circuit architecture that provides hardware synchronization between a core's or CPU's TSC, and the clock of an enabled input/output (IO). The clock management component 305 may perform functions to correlate the clocks. The clock management component may perform an operation 315 to detect the clocks internal to the integrated circuit, or SOC. For example, this may include the TSC, the timed GPIO, ART, or proprietary clock to the integrated circuit. The clock management component 305 may perform an operation 320 to detect external clocks, such a network interface clocks. For example, the Intel® 1210 network interface card (MC) by Intel® Corporation, Santa Clara, Calif. may include a precision time protocol (PTP) clock.

The clock management component 305 may receive a reference clock to be used for the correlation at operation 325. The reference clock may be a clock that has been previously selected, a clock that is identified to be used as the reference clock within the integrated circuit, or a user may be prompted to select a reference clock. The clock management component 305 may receive an indication of the synchronization precision for the correlation at operation 325. For example, the correlated synchronization may be less than 1 millisecond.

At operation 330, the clock management component 305 may correlate one or more of the internal clocks with the identified reference clock. For example, if the timed GPIO is selected as the reference clock, then the time of the timed GPIO is correlated with the TSC of the core within the identified synchronization precision. The clock management component 305 may then provide the output 335. The output 335 includes the frequency and offset of the reference clock in relation to internal clock. In another example, the reference clock may be an external clock, such as the PTP clock of an MC. Similarly, the MC clock is correlated to the TSC of the core to identify the frequency and offset as the output 335.

The execution component 310 may receive the output 335 to schedule core transactions. At operation 340, the execution component 310 receives as input the frequency and offset of the reference clock that is the output 335 of the clock management component 305. The execution component 310 performs operation 345 to schedule transactions with the core of the integrated circuit at the internal timing of the core relative to the reference clock. The execution component 310 generates output 350 of issuing transactions from the core at the scheduled internal times for the core. For example, output 350 of the execution component 310 may be the transaction being issued to the NIC.

The heterogeneous clock management described in flowchart 300 may be continuously performed such that the frequency and offset are dynamically adjusted to maintain the synchronization. For example, the NIC may be selected as the reference clock. Utilizing the NIC as the reference clock, a correlation may be continuously performed with the TSC of the core and adjusting the frequency and offset as needed to maintain the synchronization. Any type of clock or timing mechanism from the SOC and connected components may be used and correlated as part of the heterogeneous clock management and should not be limited to the clocks described herein.

The heterogeneous clock management system and architecture may assume that an application interacts with the heterogeneous clock management system to schedule relevant events on the respective device. Once the clock management component selects the reference clock, the clock management component may generate the time correlation between device and SOC. The application that may manage the various connected devices may notify the device driver as events or tasks are scheduled on these devices. These events or tasks may be periodic events or tasks that are critical to the user application. For example, an application may be a motor control algorithm delivering messages (such as pulse-width modulation messages) to the motor to discipline the motor's speed. The time at which these messages are sent is critical and may require sub-microsecond accuracy, as may be provided by the heterogeneous clock management system.

Figure 4:
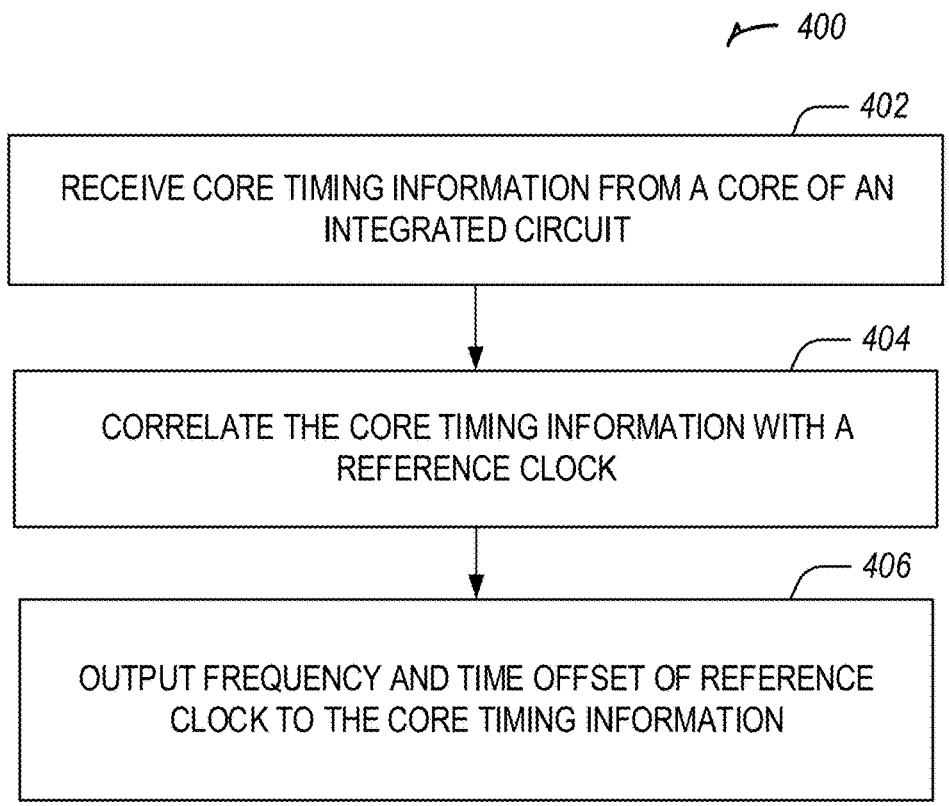
FIG. 4 illustrates a flowchart showing a technique for heterogeneous clock management, in accordance with some embodiments.

FIG. 4 illustrates a flowchart showing a technique 400 for heterogeneous clock management, in accordance with some embodiments. The technique 400 includes an operation 402 to receive core timing information from a core of an integrated circuit. The integrated circuit may have multiple cores, with each core having its own clock or TSC to provide timing information. The integrated circuit may include an internal clock, such as the ART, that may be used to cross timestamp between the cores.

The technique 400 includes an operation 404 to correlate the core timing information with a reference clock. The correlation of the core timing information with the reference clock includes correlating the reference clock within a minimum synchronization precision value of the timing of the core. The reference clock may be internal to the integrated circuit. The reference clock may be external to the integrated circuit.

The technique 400 may include an operation 406 to output frequency and time offset of reference clock to the core timing information. The technique 400 may further include an operation to schedule a transaction from the core at a scheduled time relative to the reference clock using the frequency and time offset. The technique 400 may further include an operation to issue a command to execute the transaction at the scheduled time.

Figure 5:
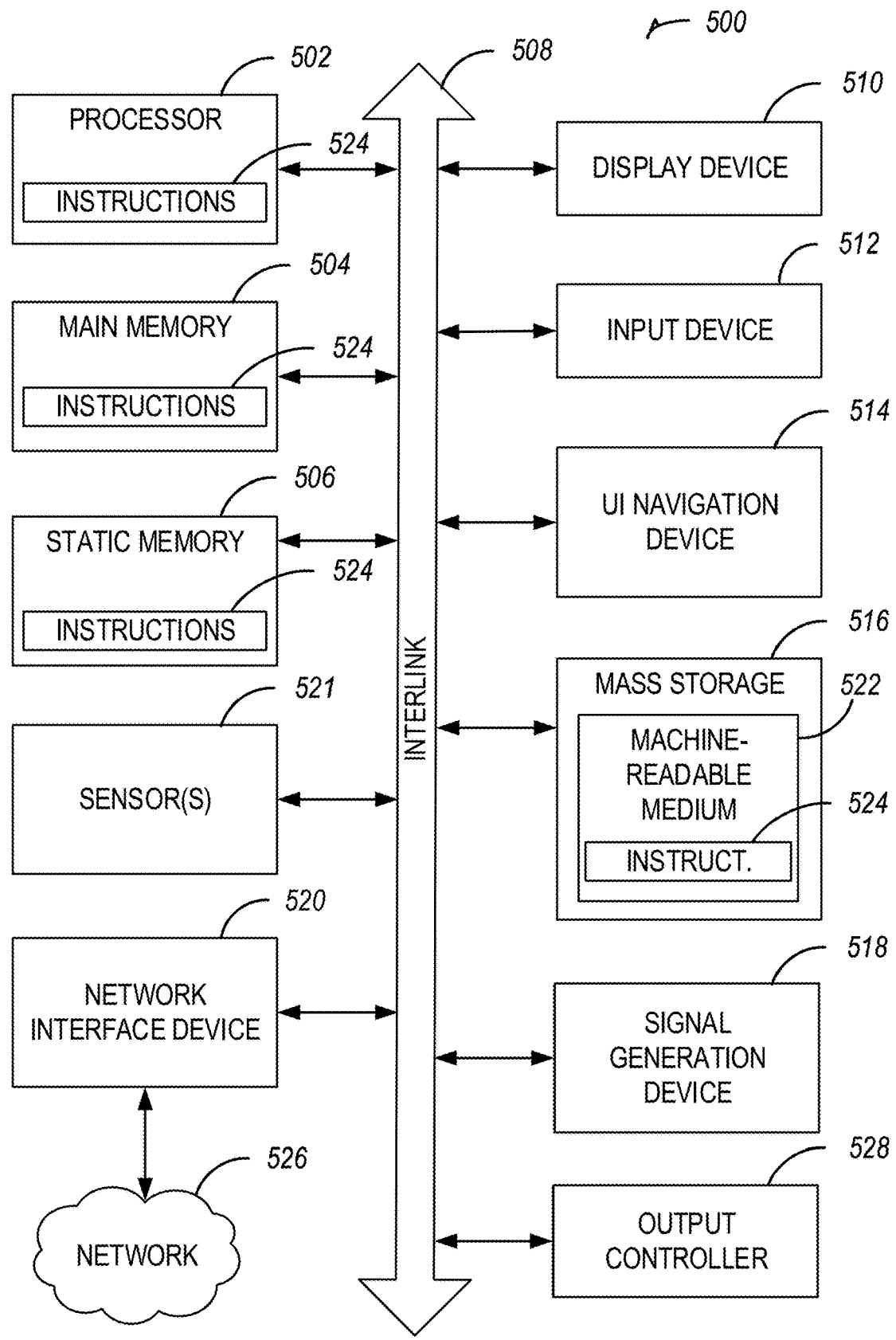
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
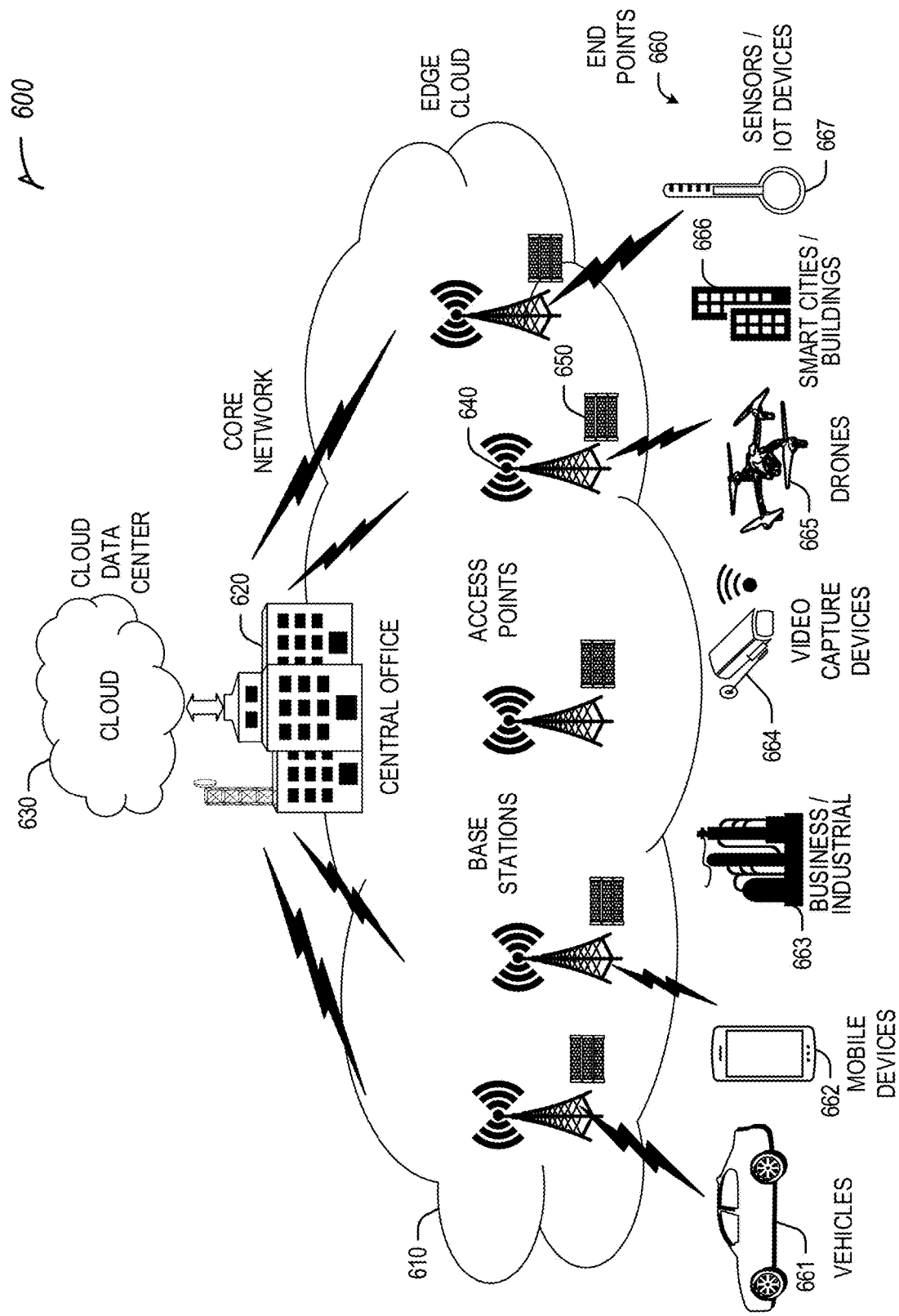
FIG. 6 illustrates an overview of an edge cloud configuration for edge computing.

FIG. 6 is a block diagram 600 showing an overview of a configuration for edge computing, which includes a layer of processing referred to in many of the following examples as an "edge cloud". As shown, the edge cloud 610 is co-located at an edge location, such as an access point or base station 640, a local processing hub 650, or a central office 620, and thus may include multiple entities, devices, and equipment instances. The edge cloud 610 is located much closer to the endpoint (consumer and producer) data sources 660 (e.g., autonomous vehicles 661, user equipment 662, business and industrial equipment 663, video capture devices 664, drones 665, smart cities and building devices 666, sensors and IoT devices 667, etc.) than the cloud data center 630. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 7:
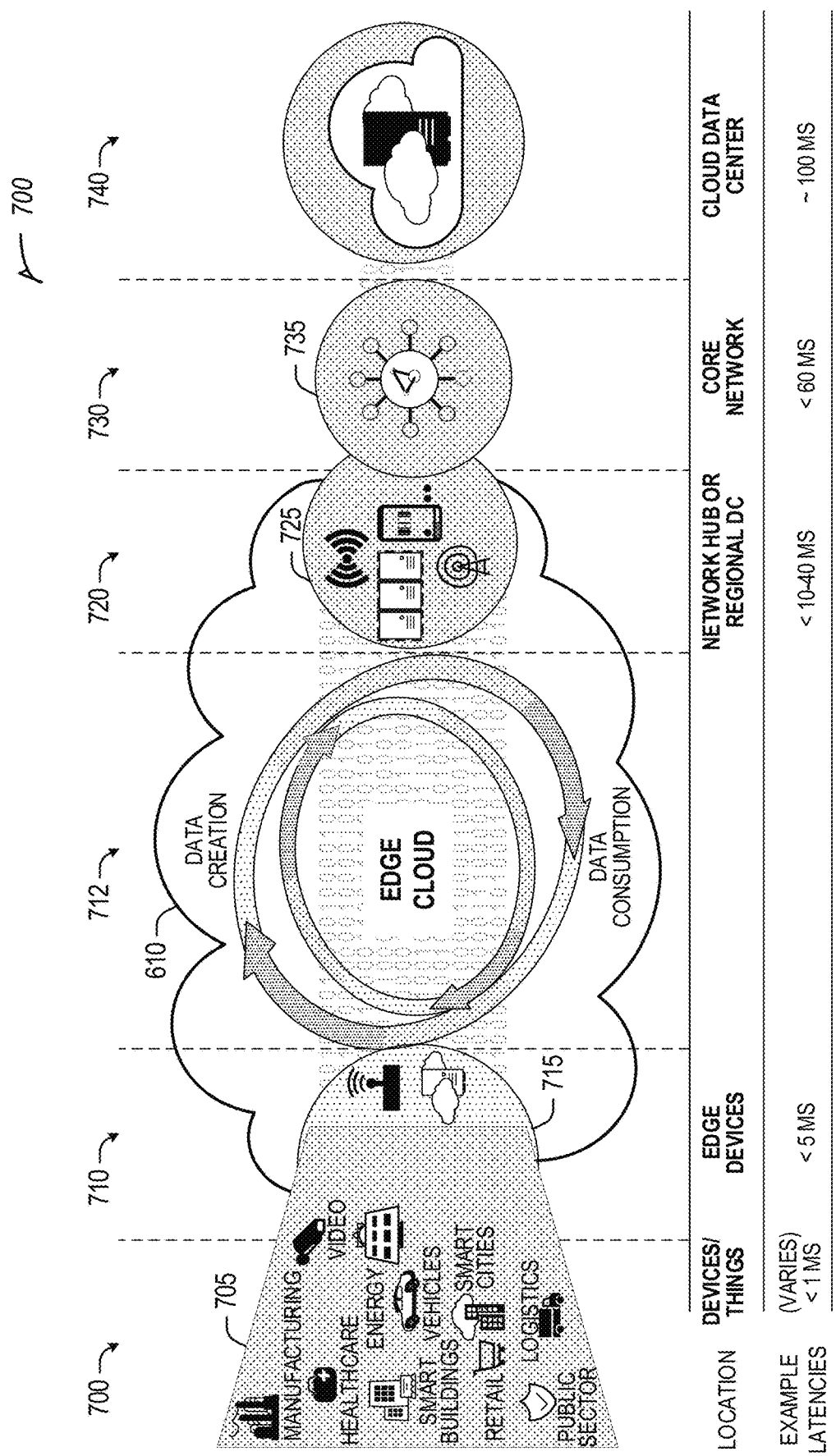
FIG. 7 illustrates operational layers among endpoints, an edge cloud, and cloud computing environments.

FIG. 7 illustrates operational layers among endpoints, an edge cloud, and cloud computing environments. Specifically, FIG. 7 depicts examples of computational use cases 705, utilizing the edge cloud 610 among multiple illustrative layers of network computing. The layers begin at an endpoint (devices and things) layer 700, which accesses the edge cloud 610 to conduct data creation, analysis, and data consumption activities. The edge cloud 610 may span multiple network layers, such as an edge devices layer 710 having gateways, on-premise servers, or network equipment (nodes 715) located in physically proximate edge systems; a network access layer 720, encompassing base stations, radio processing units, network hubs, regional data centers (DC), or local network equipment (equipment 725); and any equipment, devices, or nodes located therebetween (in layer 712, not illustrated in detail). The network communications within the edge cloud 610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 700, under 5 ms at the edge devices layer 710, to even between 10 to 40 ms when communicating with nodes at the network access layer 720. Beyond the edge cloud 610 are core network 730 and cloud data center 740 layers, each with increasing latency (e.g., between 50-60 ms at the core network layer 730, to 100 or more ms at the cloud data center layer). As a result, operations at a core network data center 735 or a cloud data center 745, with latencies of at least 50 to 100 ms or more, will not be able to accomplish many time-critical functions of the use cases 705. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 735 or a cloud data center 745, a central office or content data network may be considered as being located within a "near edge" layer ("near" to the cloud, having high latency values when communicating with the devices and endpoints of the use cases 705), whereas an access point, base station, on-premise server, or network gateway may be considered as located within a "far edge" layer ("far" from the cloud, having low latency values when communicating with the devices and endpoints of the use cases 705). It will be understood that other categorizations of a particular network layer as constituting a "close", "local", "near", "middle", or "far" edge may be based on latency, distance, number of network hops, or other measurable characteristics, as measured from a source in any of the network layers 700-740.

The various use cases 705 may access resources under usage pressure from incoming streams, due to multiple services utilizing the edge cloud. To achieve results with low latency, the services executed within the edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 610 may provide the ability to serve and respond to multiple applications of the use cases 705 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 610 (network layers 700-740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 610.

As such, the edge cloud 610 is formed from network components and functional features operated by and within edge gateway nodes, edge aggregation nodes, or other edge compute nodes among network layers 710-730. The edge cloud 610 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 610 may be servers, multi-tenant servers, appliance computing devices, and/or any other type of computing devices. For example, the edge cloud 610 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 610 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 8:
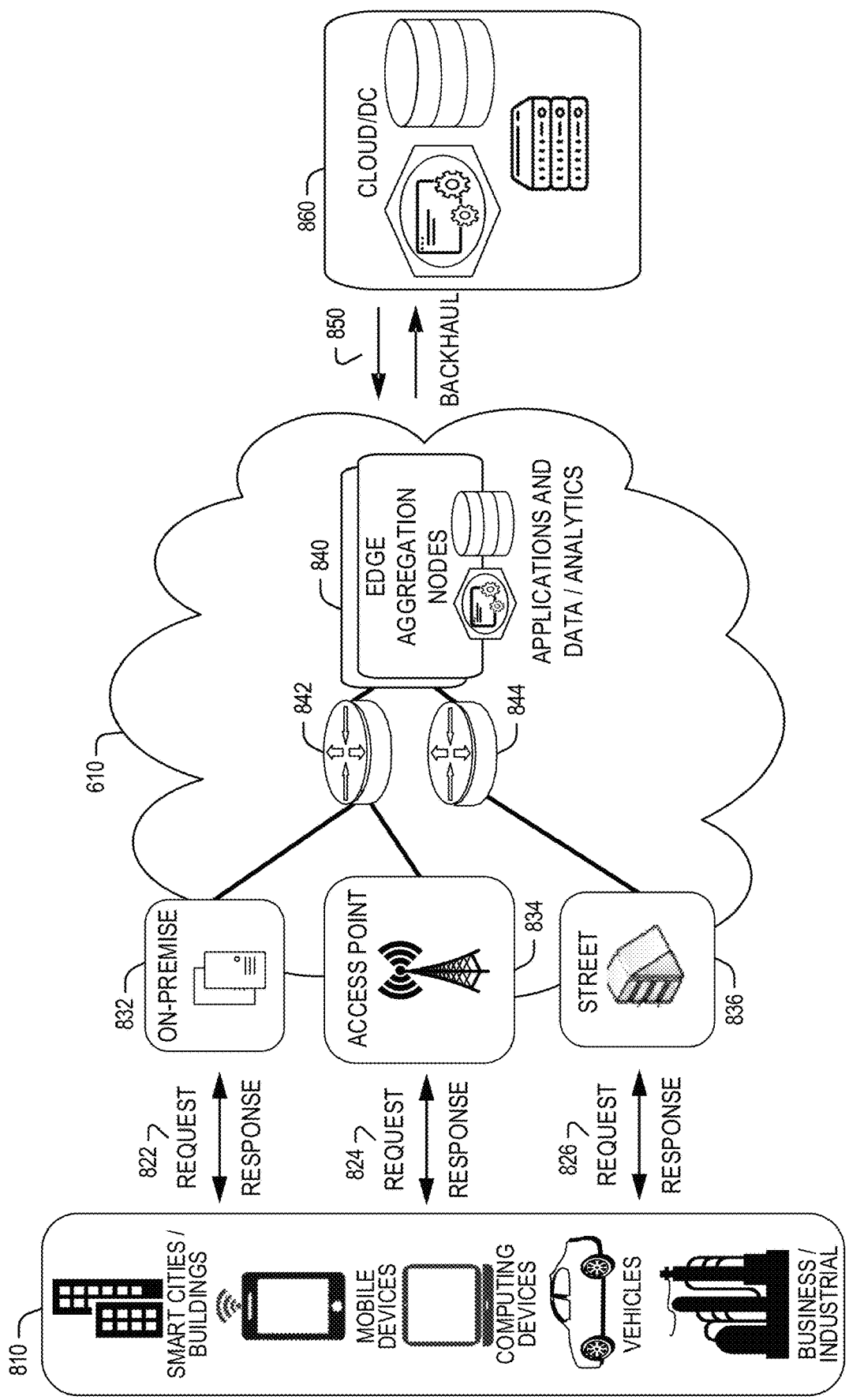
FIG. 8 illustrates an example approach for networking and services in an edge computing system.

In FIG. 8, various client endpoints 810 (in the form of mobile devices, computers, autonomous vehicles, business computing equipment, industrial processing equipment) exchange requests and responses that are specific to the type of endpoint network aggregation. For instance, client endpoints 810 may obtain network access via a wired broadband network, by exchanging requests and responses 822 through an on-premise network system 832. Some client endpoints 810, such as mobile computing devices, may obtain network access via a wireless broadband network, by exchanging requests and responses 824 through an access point (e.g., cellular network tower) 834. Some client endpoints 810, such as autonomous vehicles may obtain network access for requests and responses 826 via a wireless vehicular network through a street-located network system 836. However, regardless of the type of network access, the TSP may deploy aggregation points 842, 844 within the edge cloud 610 to aggregate traffic and requests. Thus, within the edge cloud 610, the TSP may deploy various compute and storage resources, such as at edge aggregation nodes 840, to provide requested content. The edge aggregation nodes 840 and other systems of the edge cloud 610 are connected to a cloud or data center 860, which uses a backhaul network 850 to fulfill higher-latency requests from a cloud/data center for websites, applications, database servers, etc. Additional or consolidated instances of the edge aggregation nodes 840 and the aggregation points 842, 844, including those deployed on a single server framework, may also be present within the edge cloud 610 or other areas of the TSP infrastructure.

ADDITIONAL NOTES & EXAMPLES

Example 1 is a system for heterogeneous clock management, the system comprising: a clock management circuit to: receive core timing information from a core of an integrated circuit; correlate the core timing information with a reference clock; and output frequency and time offset of the reference clock to the core timing information.

In Example 2, the subject matter of Example 1 includes, wherein correlating the core timing information with the reference clock is within a minimum synchronization precision value.

In Example 3, the subject matter of Examples 1-2 includes, wherein the reference clock is internal to the integrated circuit.

In Example 4, the subject matter of Examples 1-3 includes, wherein a source for the reference clock is a network interface clock.

In Example 5, the subject matter of Examples 1-4 includes, the system further comprising: an execution circuit to: schedule a transaction from the core at a scheduled time relative to the reference clock using the frequency and time offset; and issue a command to execute the transaction at the scheduled time.

In Example 6, the subject matter of Examples 1-5 includes, the system further comprising: the clock management circuit to: detect clocks internal to the integrated circuit; and detect clocks external to the integrated circuit.

In Example 7, the subject matter of Examples 1-6 includes, wherein a user is prompted for a preferred reference clock as the reference clock from the clocks internal to the integrated circuit and the clocks external to the integrated circuit.

Example 8 is at least one machine-readable medium including instructions for heterogeneous clock management of an integrated circuit, the instructions when executed by the integrated circuit, cause the integrated circuit to perform operations comprising: receiving core timing information from a core of the integrated circuit; correlating the core timing information with a reference clock; and outputting frequency and time offset of the reference clock to the core timing information.

In Example 9, the subject matter of Example 8 includes, wherein correlating the core timing information with the reference clock is within a minimum synchronization precision value.

In Example 10, the subject matter of Examples 8-9 includes, wherein the reference clock is internal to the integrated circuit.

In Example 11, the subject matter of Examples 8-10 includes, wherein a source for the reference clock is a network interface clock.

In Example 12, the subject matter of Examples 8-11 includes, the operations further comprising: scheduling a transaction from the core at a scheduled time relative to the reference clock using the frequency and time offset; and issuing a command to execute the transaction at the scheduled time.

In Example 13, the subject matter of Examples 8-12 includes, the operations further comprising: detecting clocks internal to the integrated circuit; and detecting clocks external to the integrated circuit.

In Example 14, the subject matter of Examples 8-13 includes, wherein a user is prompted for a preferred reference clock as the reference clock from the clocks internal to the integrated circuit and the clocks external to the integrated circuit.

Example 15 is a method for heterogeneous clock management, comprising: receiving core timing information from a core of an integrated circuit; correlating the core timing information with a reference clock; and outputting frequency and time offset of the reference clock to the core timing information.

In Example 16, the subject matter of Example 15 includes, wherein correlating the core timing information with the reference clock is within a minimum synchronization precision value.

In Example 17, the subject matter of Examples 15-16 includes, wherein the reference clock is internal to the integrated circuit.

In Example 18, the subject matter of Examples 15-17 includes, wherein a source for the reference clock is a network interface clock.

In Example 19, the subject matter of Examples 15-18 includes, scheduling a transaction from the core at a scheduled time relative to the reference clock using the frequency and time offset; and issuing a command to execute the transaction at the scheduled time.

In Example 20, the subject matter of Examples 15-19 includes, detecting clocks internal to the integrated circuit; and detecting clocks external to the integrated circuit.

In Example 21, the subject matter of Examples 1-20 includes, wherein a user is prompted for a preferred reference clock as the reference clock from the clocks internal to the integrated circuit and the clocks external to the integrated circuit.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

Example 26 is a programmable logic controller configured to implement any of the configurations or operations of Examples 1 to 21.

Example 27 is a central processing unit (CPU) configured to implement any of the configurations or operations of Examples 1 to 21.

Example 28 is a network interface card (NIC) configured to implement any of the configurations or operations of Examples 1 to 21.

Example 29 is a sensor configured to implement any of the configurations or operations of Examples 1 to 21.

Example 30 is a system on a chip (SoC) configured to implement any of the configurations or operations of Examples 1 to 21.

Example 31 is an Internet of Things (IoT) device configured to implement any of the configurations or operations of Examples 1 to 21.

Example 32 is a programmable automation controller (PAC) configured to implement any of the configurations or operations of Examples 1 to 21.

Example 33 is a field programmable gate array (FPGA) configured to implement any of the configurations or operations of Examples 1 to 21.

Example 34 is an application specific integrated circuit (ASIC) configured to implement any of the configurations or operations of Examples 1 to 21.

Example 35 is a local area network (LAN) controller configured to implement any of the configurations or operations of Examples 1 to 21.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for heterogeneous clock management, the system comprising:
 a clock management circuit to:
 receive core timing information from a core of an integrated circuit;
 correlate the core timing information with a reference clock; and
 output, to the core of the integrated circuit, a frequency and time offset of the reference clock to the core timing information, for scheduling transactions with the core of the integrated circuit at an internal timing of the core of the integrated circuit relative to the reference clock.

2. The system of claim 1, wherein correlating the core timing information with the reference clock is within a synchronization precision value of the core.

3. The system of claim 1, wherein the reference clock is internal to the integrated circuit.

4. The system of claim 1, wherein a source for the reference clock is a network interface clock.

5. The system of claim 1, the system further comprising:
an execution circuit to:
schedule a transaction from the core at a scheduled time relative to the reference clock using the frequency and time offset; and
issue a command to execute the transaction at the scheduled time.

6. The system of claim 1, the system further comprising: the clock management circuit to:
detect clocks internal to the integrated circuit; and
detect clocks external to the integrated circuit.

7. The system of claim 1, wherein a user is prompted for a preferred reference clock as the reference clock from the clocks internal to the integrated circuit and the clocks external to the integrated circuit.

8. At least one non-transitory machine-readable medium including instructions for heterogeneous clock management of an integrated circuit, the instructions when executed by the integrated circuit, cause the integrated circuit to perform operations comprising:
receiving core timing information from a core of the integrated circuit;
correlating the core timing information with a reference clock; and
outputting, to the core of the integrated circuit, a frequency and time offset of the reference clock to the core timing information, for scheduling transactions with the core of the integrated circuit at an internal timing of the core of the integrated circuit relative to the reference clock.

9. The at least one non-transitory machine-readable medium of claim 8, wherein correlating the core timing information with the reference clock is within a synchronization precision value of the core.

10. The at least one non-transitory machine-readable medium of claim 8, wherein the reference clock is internal to the integrated circuit.

11. The at least one non-transitory machine-readable medium of claim 8, wherein a source for the reference clock is a network interface clock.

12. The at least one non-transitory machine-readable medium of claim 8, the operations further comprising:
scheduling a transaction from the core at a scheduled time relative to the reference clock using the frequency and time offset; and
issuing a command to execute the transaction at the scheduled time.

13. The at least one non-transitory machine-readable medium of claim 8, the operations further comprising:
detecting clocks internal to the integrated circuit; and
detecting clocks external to the integrated circuit.

14. The at least one non-transitory machine-readable medium of claim 8, wherein a user is prompted for a preferred reference clock as the reference clock from the clocks internal to the integrated circuit and the clocks external to the integrated circuit.

15. A method for heterogeneous clock management, comprising:
receiving core timing information from a core of an integrated circuit;
correlating the core timing information with a reference clock; and
outputting, to the core of the integrated circuit, a frequency and time offset of the reference clock to the core timing information, for scheduling transactions with the core of the integrated circuit at an internal timing of the core of the integrated circuit relative to the reference clock.

16. The method of claim 15, wherein correlating the core timing information with the reference clock is within a synchronization precision value of the core.

17. The method of claim 15, wherein the reference clock is internal to the integrated circuit.

18. The method of claim 15, wherein a source for the reference clock is a network interface clock.

19. The method of claim 15, further comprising:
scheduling a transaction from the core at a scheduled time relative to the reference clock using the frequency and time offset; and
issuing a command to execute the transaction at the scheduled time.

20. The method of claim 15, further comprising:
detecting clocks internal to the integrated circuit; and
detecting clocks external to the integrated circuit.

* * * * *